Patented May 19, 1953

2,639,212

UNITED STATES PATENT OFFICE 2,639,212

PAN LINER

Paul Thompson, Wellesley Hills, Mass., assignor to Bestpak Inc., Boston, Mass., a corporation of Massachusetts No Drawing. Application June 7, 1950, Serial No. 166,770

1 Claim. (Cl. 8—120)

This invention comprises a new and improved liner for baking pans, the liner being constructed of cellulose base material and having a contact surface formed in situ by the chemical reaction of the cellulose material with a reacting chemical, thus providing a surface which is physically integral with but chemically different from the base material.

A liner for baking pans should be non-toxic, inert, flexible, and capable of withstanding the elevated temperatures to which it will be subjected during baking. It is highly desirable to make the liner of inexpensive construction and of such material that it will not become adhered either to the pan or to the baked product during any part of the handling and processing.

A primary object of my invention is to produce a liner for baking utensils which is sturdy enough to aid materially in the handling and packaging of baked product when removed from the utensil, which will part readily from the baking utensil and at any later date will also part freely from the baked product leaving it whole and uncontaminated and the liner clean and essentially in its original condition ready for further use if desired.

A further object of the invention is to use as the base for the improved liner a material comprised chiefly of cellulose in the form of paper since the use of cellulosic material is an accepted feature of the trade due to its low cost and general mechanical characteristics plus the disposability feature.

Another object of my invention is to modify the chemical structure of the liner in such a way as to provide a new chemical surface but still to retain the mechanical characteristics and mechanical integrity of the paper structure.

A still further object is so to treat the cellulosic base material chemically that only the new chemical surface can contact the baking pan or the baked product.

Another object is to make available a process of treatment whereby paper can be converted to the desired form either in the sheet or in the dimensions of the finished liner.

Ordinary paper cannot be used as a liner in baking yeast raised products inasmuch as the products stick to the paper so that the paper cannot be removed from the baked product without leaving a substantial amount of the product on the paper. All previous attempts to solve this problem have been based on providing a heavy coating of wax or shortening on the surface of the paper. This melts almost immediately upon entering the oven with the result that the coating either enters the paper or the product or both, a condition which is not satisfactory either from the point of view of the product or the package. These coatings of wax or shortening may serve over a narrow range of products containing a high shortening content or in which the sugar is in balance with the shortening (one in which the percentage of sugar is not greater than the percentage of shortening). They are not satisfactory where the product has a low shortening content or where the sugar is overbalanced. Under such conditions the product sticks badly, leaving much of the product on the lining.

I have discovered that the way to achieve the desired results is not to coat paper with a mechanical film but rather to insure that the reactive chemical contacting the cellulose forms an integral chemical union with the ultimate cellulose molecules and thereby forms a new surface throughout the paper structure comprising a fundamentally different chemical structure adapted to the desired use but forming a continuous and integral part with the cellulose of the undisturbed paper structure itself.

In order to achieve this it is necessary that the reactive chemical be reacted with the cellulose of the paper in situ. The finished liner may be treated in this manner but I prefer to contact and react the cellulose in sheet form with the reactive chemical before the liners are cut from the paper sheet.

Obviously, only those reactive chemicals capable of reacting with cellulose under the imposed conditions come within the scope of my invention. Care must be taken in selecting the conditions to avoid ruining the paper structure with by-products from the reaction and to avoid too severe extremes of temperature, concentrations, etc., during the reaction.

I have found, for instance, that if acetic anhydride is dissolved in glacial acetic acid in the proper concentration (about 3%) and allowed to react (at a temperature not over 40° C.) with paper of the kraft, sulfite, news or parchment type, or with alpha pulp, a clear transparent film of cellulose acetate, chemically distinct from but physically integral with the smooth paper or pulp surface and probably only a few molecules in thickness can be formed. When the paper or pulp is washed and dried it is ready for use as a pan liner material in accordance with my invention.

Further, benzoic anhydride if dissolved in glacial acetic acid and reacted with the cellulose of the paper can produce the same satisfactory new chemical paper surface to act as a liner while leaving the mechanical form of the paper intact. In this case the protective film will be of cellulose benzoate.

In other fashion stearyl chloride can also be reacted with pulp, for instance, by the well known Schotten-Baumen reaction to form a very effective new paper surface of cellulose stearate. Likewise benzoyl chloride can be utilized. In each case the sodium hydroxide present protects the cellulose from action of hydrochloric acid, thereby serving a necessarily useful function until the by-products can be washed out.

In all the above mentioned cases, I have found that a concentration of about 1–3% of the reactive esterifying chemical is sufficient and not in excess to treat the pulp or paper to produce an integral esterified and otherwise undisturbed surface on the paper.

I have further found that a particularly effective surface is formed by a type of compound which will not only react with the cellulose but will also partially polymerize during the reaction to form a polymer-cellulose complex. Such a compound is found among the stearic acid-heavy metal salt complexes of which one is stearato chromic chloride. When this material in about 3% concentration in water and alcohol is used to treat paper such as kraft, sulfite, news or parchment it will react to form just the kind of new cellulose complex surface adequate to meet all the objects of this invention. One way in which I can perform this reaction to provide the paper with a new smooth surface is by the following procedure:

The chloride is dissolved in a mixture of alcohol (either ethyl or isopropyl) and water so that the final proportions are about 91% water, 6% alcohol and 3% acid chloride complex. To this is added a small amount of sodium formate and urea dissolved in water at a concentration of about 5% sodium formate and 15% urea. An amount approximately equivalent to the acid chloride in weight is added. The paper is then passed through this solution, further passed through squeeze rolls and then to a drier where the reaction is completed. The drier is maintained about 215° F. and may be a series of steam heated rolls or a hot air drier. After drying the paper is ready for use.

On the other hand it is also possible to spray the chloride complex solution directly onto the surface of the paper before drying, thereby achieving the same effective chemical surfacing but at somewhat added cost and inconvenience.

I have also found that a concentration of less than ⅓% of this chloride is ineffective for my use while a concentration of over 3% is likewise ineffective. I do not try to explain this phenomenon but rather limit myself to use of this material in concentration between ⅓% and 3% in the treating solution.

In addition I have found that by treating my new cellulose composition surface with a 2% or up to a 5% water solution of polyvinylalcohol, of medium viscosity, and then drying the paper again that I can form a surface with improved grease resistant properties. This is in addition to the cellulose composition film and is quite important in manufacturing liners such as mine since all products which would be baked and packaged in these liners contain shortening that tends to penetrate as a grease. The use of polyvinyl alcohol provides a barrier so that the shortening does not stain the package and does not leave the product, thus retaining the goodness of the product within itself.

To put polyvinyl alcohol on my new cellulose composition surface I simply pass the treated paper through a water solution of polyvinyl alcohol in 2% to 5% concentration and then through squeeze rolls to remove excess material from the sheet. On drying the paper is ready to be cut into liners.

I have found also, surprisingly enough, that I can add the polyvinyl alcohol directly to my chloride solution in the process of making it and achieve good results by the simultaneous application of the reacting chemical and the coating chemical to the paper.

Having thus disclosed my invention and described in detail several embodiments thereof, I claim as new and desire to secure by Letters Patent:

A new and improved pan liner comprising a body of paper having a smooth, undisturbed and integral surface portion thereof which has been converted in situ into an esterified cellulose composition selected from the group consisting of cellulose acetate, cellulose benzoate and cellulose stearate, the said surface portion being capable of withstanding elevated baking temperatures without impairing its characteristic of freely parting from the baked product.

PAUL THOMPSON.

References Cited in the file of this patent

UNITED STATES PATENTS

| Number | Name | Date |
| --- | --- | --- |
| 1,546,211 | Dreyfus | July 14, 1925 |
| 1,659,399 | Faber | Feb. 14, 1928 |
| 1,680,934 | Buel | Aug. 14, 1928 |
| 1,840,404 | Malm | Jan. 12, 1932 |
| 1,897,026 | Karrer | Feb. 7, 1933 |
| 2,218,388 | Twombly | Oct. 15, 1940 |
| 2,328,844 | Osterhof | Sept. 7, 1943 |
| 2,362,580 | Nadeau et al. | Nov. 14, 1944 |
| 2,370,419 | Ray | Feb. 27, 1945 |